US007736104B2

(12) United States Patent
Hobson

(10) Patent No.: US 7,736,104 B2
(45) Date of Patent: Jun. 15, 2010

(54) DOCKING AND SECUREMENT SYSTEM FOR WHEELED MOBILITY DEVICES

(75) Inventor: Douglas A. Hobson, Pittsburgh, PA (US)

(73) Assignee: University of Pittsburgh–of the Commonwealth System of Higher Education, Pittsburgh, PA (US)

( * ) Notice: Subject to any disclaimer, the term of this patent is extended or adjusted under 35 U.S.C. 154(b) by 705 days.

(21) Appl. No.: 11/518,975

(22) Filed: Sep. 11, 2006

(65) Prior Publication Data

US 2007/0189871 A1 Aug. 16, 2007

Related U.S. Application Data

(60) Provisional application No. 60/715,460, filed on Sep. 10, 2005.

(51) Int. Cl.
*B60P 7/08* (2006.01)

(52) U.S. Cl. .................................... 410/7; 410/4; 410/8

(58) Field of Classification Search ..................... 410/3, 410/4, 7, 8, 9, 19, 22, 51, 77; 280/304.1; 296/65.04; 297/DIG. 4; 248/503.1
See application file for complete search history.

(56) References Cited

U.S. PATENT DOCUMENTS 5,388,937 A * 2/1995 Farsai ............................ 410/9
6,231,283 B1 * 5/2001 Stowers ......................... 410/9

OTHER PUBLICATIONS

Hunter-Zaworski KM, Ullman DG, Herlineg, DE. Application of the Quality Functional Deployment Method in Mobility aid Securement System Design: vol. 1. Transportation Research Institute, Oregon State University. Final Report-Dec. 1992. NTIS No. FTA-OR-11-0006-92-1.

Fisher WE, Seeger BR, Svensson NL. Development of an Australian Standard for wheelchair occupant restraint assemblies for motor vehicles. Journal of Rehab Research and Development 1987; 24(3):23-24.

* cited by examiner

*Primary Examiner*—Stephen Gordon
(74) *Attorney, Agent, or Firm*—Bartony & Associates LLC

(57) ABSTRACT

A docking device for use with a wheeled mobility device having a device interface on a rear thereof includes a securing mechanism to dock with the device interface. The securing mechanism is adapted to dock with the device interface upon rearward motion of the wheeled mobility device relative to the docking device regardless of the horizontal position of the mobility device over a range of horizontal positions of the mobility device. The securing device can also be adapted to dock with the device interface regardless of the angle of the device interface relative to the docking device over a range of angles of the device interface. Further, the securing device can be adapted to dock with the device interface regardless of the vertical position of the device interface relative to the docking device over a range of vertical positions of the device interface.

21 Claims, 10 Drawing Sheets

DOCKING AND SECUREMENT SYSTEM FOR WHEELED MOBILITY DEVICES

CROSS-REFERENCE TO RELATED APPLICATION

This application claims benefit of U.S. Provisional Patent Application No. 60/715,460, filed Sep. 10, 2005, the disclosure of which is incorporated herein by reference.

GOVERNMENT INTEREST

This invention was made with government support under grant number 2 R42 HD34641-02 from the National Institutes of Health and grant number H133P30002 from the National Institute on Disability and Rehabilitation Research. The government has certain rights in this invention.

BACKGROUND OF THE INVENTION

The present invention relates to docking or securement devices, systems and methods for securing wheeled mobility devices (WMDs) used by persons with physical disabilities in both public and private transport vehicles.

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

An increasing number of people with disabilities use wheeled mobility devices (WMD) (e.g., traditional manual and powered wheelchairs, powered bases, scooters, strollers) as a means of accessing public and private motor vehicles. For many, the ability to remain seated in their WMD while riding in a transport vehicle is the only feasible means of gaining access to education, work or recreational activities. The vast majority of WMDs, both traditional and contemporary, are not designed to be used as seats in a transport/transit vehicle. The wheels, seat and frame structures and battery containers were not engineered to withstand the potentially high "g" forces of a crash. Furthermore, most WMDs do not have designated attachment points for securement to the vehicle and, therefore, securement, both in terms of strength and location on the frame, can often be haphazard and uncertain from a safety viewpoint. Therefore, most secured WMDs do not provide the WMD-seated occupant with an equivalent level of travel safety as that provided the non-disabled rider by a car, van, or transport vehicle seat.

It is generally recognized that both the occupant restraint and the WMD securement device must act together as an integral crash protection system. There are essentially two basic approaches to the securement of WMDs that are in common use today, attendant-operated securement systems and auto-engaging docking devices. The attendant-operated type is dominated largely by three or four-point strap-type devices that hook to various parts of the WMD frame. Problems quickly arise when there are no appropriate locations to attach the securement belts to the WMD. An example of this situation is encountered with scooter and power bases where molded plastic housings enclose the structural frame. Also, the requirement that an attendant or vehicle operator always be present and time required to secure the WMDs creates logistical problems for the transporter. Hunter-Zaworski K M, Ullman D G, Herlineg, D E. Application of the Quality Functional Deployment Method in Mobility aid Securement System Design: Volume 1. Transportation Research Institute, Oregon State University. Final Report-December 1992. NTIS Number: FTA-OR-11-0006-92-1. Additionally, test results have indicated that existing strap tiedown systems are at the upper limits of their capacity when tested at 30 mph/20 g loading. Fisher W E, Seeger B R, Svensson N L. Development of an Australian Standard for wheelchair occupant restraint assemblies for motor vehicles. *Journal of Rehab Research and Development* 1987; 24(3): 23-24. This implies that many heavier models of powered WMDs may not be secure at nominal crash load levels. Also, users of transport vehicles have expressed dissatisfaction with operators having to fumble around their legs and upper body while fastening or disengaging the strap devices. Because of the difficulty and inconvenience of using strap systems they are often simply not used at all, or are not fastened in a way that will provide adequate crash protection. Moreover, strap-type securement devices are inconsistent with the intent of Americans with Disabilities Act (ADA), which is to provide persons with disabilities increased access to community resources through improved independent use of public transportation systems.

Several docking-type securement devices are commercially available but use is limited largely to private vehicles. These devices have matching components, one attached to the WMD frame and the other (docking securement device) to the vehicle. Hunter-Zaworski K M, Ullman D G, Herlineg, D E. Application of the Quality Functional Deployment Method in Mobility aid Securement System Design: Volume 1. Transportation Research Institute, Oregon State University. Final Report-December 1992. NTIS Number: FTA-OR-11-0006-92-1. They offer increased user independence, but rely on having a location on the WMD to which one component (WMD adapter) of the securement system can be attached. As mentioned above, most WMDs do not have appropriate securement attachment locations. Also, since there is such a variety of WMDs, a large number of WMD adapter configurations must be provided by a third party manufacturer, each of which needs to be safety tested. To date, WMD manufacturers have not provided adapters for their products, mainly as a result increased liability and cost of producing and testing a different adapter for each model of WMD product.

Docking devices have been shown to work reasonably well for private vehicles in which the matching components can be individually configured. However, public vehicles must be able to accept any WMD to be universally applicable. Early docking devices represent a departure from the four-strap tiedown approach, and are the first step towards a more universal and user-independent solution. However, the existing docking designs do not provide a universal solution to the public transit problem, where the majority of WMDs are used Efforts to foster the development of a universal industry design standard for the interface hardware between WMDs and docking-type securement devices by the Rehabilitation Engineering Research Center (RERC) on Wheeled Mobility at the University of Pittsburgh have led to development and publishing in 2005 of a voluntary international standard (ISO 10542-3) for wheelchair docking securement devices by the International Standards Organization (ISO), the disclosure of which is incorporated herein by reference.

However, the transportation of WMD users in North America remains in a state of chaos. The manifestations are that users are inconvenienced, transportation time and costs are unnecessarily high, legal liabilities are pervasive, and most importantly, user safety in many cases is seriously compromised. The ADA mandate of accessibility and safety, although laudatory in its intent, is technically not achievable with existing restraint and strap-type securement technology.

It is therefore desirable to develop improved devices, systems and methods for securing (and preferably auto-docking) WMD device within vehicles. Preferably, such devices, systems and method are compatible with the ISO 10542-3 industry standard.

SUMMARY OF THE INVENTION

In one aspect, the present invention provides a docking device for use with a wheeled mobility device comprising a device interface on a rear thereof. The docking device comprises a securing mechanism to dock with the device interface. The securing mechanism is adapted to dock with the device interface upon rearward motion of the wheeled mobility device relative to the docking device regardless of the horizontal position of the mobility device over a range of horizontal positions of the mobility device.

The securing device can also be adapted to dock with the device interface regardless of the angle of the device interface relative to the docking device over a range of angles of the device interface. Further, the securing device can be adapted to dock with the device interface regardless of the vertical position of the device interface relative to the docking device over a range of vertical positions of the device interface.

In several embodiments, the range of horizontal positions of the device interface is at least ±4 inches. The range of angles of the device interface can, for example, be at least ±10° with respect to a position generally perpendicular to the generally horizontally extending member of the docking device.

In several embodiments, the device interface is a universal device interface comprising a first attachment element extending generally vertically and a second attachment element extending generally vertically. The first attachment element is horizontally spaced from the second attachment element. The securing mechanism can, for example, comprise at least a first securing member adapted to attach to the first attachment element and a second securing member adapted to attach to the second attachment element.

The first securing member can be operatively connected to a first drive adapted to move the securing member in a first direction and the second securing member can be operatively connected to a second drive adapted to move the second securing device in a second direction generally opposed to the first direction.

The docking device can further comprises an actuator system in operative connection with the first drive member and the second drive member. The actuator system is adapted to activate the first drive member and the second drive member when the device interface reaches predefined position (or range or positions) relative to the docking device.

The docking device can also comprise a generally horizontal extending member, frame or beam along which the first securing member and the second securing member are moveable. In several embodiments, the docking device comprises a support (for example, a pedestal) in operative connection with the extending member. The support is adapted to connect the docking device to a vehicle. The extending member, the first securing member and the second securing member can be rotatably connected to the support over a range of angles so that and the securing device is adapted to dock with the device interface regardless of the angle of the device interface relative to the docking device over a range of angles of the device interface relative to the device interface.

The extending member, the first securing member and the second securing member can also be moveable in a generally vertical direction relative to the support member so that the securing device is adapted to dock with the device interface regardless of the vertical position of the device interface relative to the docking device over a range of vertical positions of the device interface.

The first securing member can, for example, comprise a first hook-shaped or J-shaped member adapted to engage the first attachment element of the universal device interface and the second securing member can, for example, comprise a second hook-shaped or J-shaped member adapted to engage the second attachment element of the device interface.

In several embodiment, the first drive can, for example, comprise a first air cylinder and the second drive can, for example, comprise a second air cylinder. The docking device can, for example, comprise a housing in which the first drive member and the second drive member are positioned. The housing can comprise a generally horizontally extending opening. The first securing device is in operative connection with the first drive member. The first securing device is moveable in the first direction along the length of the opening. The second securing device is in operative connection with the second drive member. The second securing device is moveable in the second direction along the length of the opening.

The housing can, for example comprise a monolithic length of extruded aluminum. The extending opening can be formed in the length of extruded aluminum. The length of extruded aluminum can comprise a volume therein in connection with the extending opening in which the first drive and the second drive are positioned.

The docking device can further comprise a vertical alignment member in operative connection with the extending member. The vertical alignment member is adapted to move the extending member vertically upon contact the universal interface docking geometry (UDIG) device or the device interface. The vertical alignment member can, for example, be adapted to contact a generally horizontal member connecting the first attachment element and the second attachment element of the universal docking interface geometry device. In several embodiments, the vertical alignment member comprises an upper contact member having a first sloped surface and a lower contact member having a second sloped surface that slopes in an opposite manner than the first sloped surface.

The docking system can further comprise a sensing system to sense the proximity of the device interface, and a control system in operative connection with the sensing system. The sensing system is adapted to send a signal to the control system to cause movement of the securing devices to from an attachment with the first attachment element and the second attachment element.

In another aspect, the present invention provides a docking system to secure a wheeled mobility device having attached thereto a device interface comprising a first attachment element extending generally vertically and a second attachment element extending generally vertically. The first attachment element is horizontally spaced from the second attachment element. The docking system comprises a generally horizontal extending member along which a first hook-shaped securing device and the second hook-shaped securing device are moveable in an opposing manner. A sensing system is provided to sense the proximity of the device interface. A control system is in operative connection with the sensing system. The sensing system is adapted to send a signal to the control system to cause movement of the hook-shaped securing devices to from an attachment with the first attachment element and the second attachment element. The first securing device and the second securing device are self centering over a range of horizontal positions such that the securing mechanism is adapted to dock with the device interface upon motion of the wheeled mobility device relative to the docking device regardless of the horizontal position of the mobility device over a range of horizontal positions of the mobility device.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 10A1 illustrates a cutaway view of the system of FIG. 10A through line A-A of FIG. 10A.

FIG. 10B1 illustrates a cutaway view of the system of FIG. 10A through line A-A of FIG. 10B.

DETAILED DESCRIPTION OF THE INVENTION

Figure 3A:
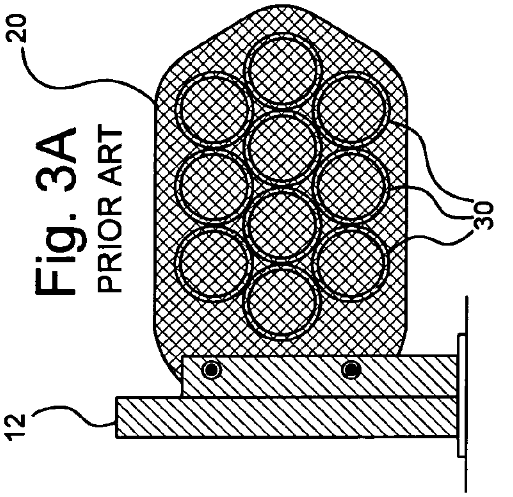
Fig. 3A PRIOR ART
FIG. 3A illustrates a side view of a bellows panel of the system of FIG. 1.
Figure 3B:
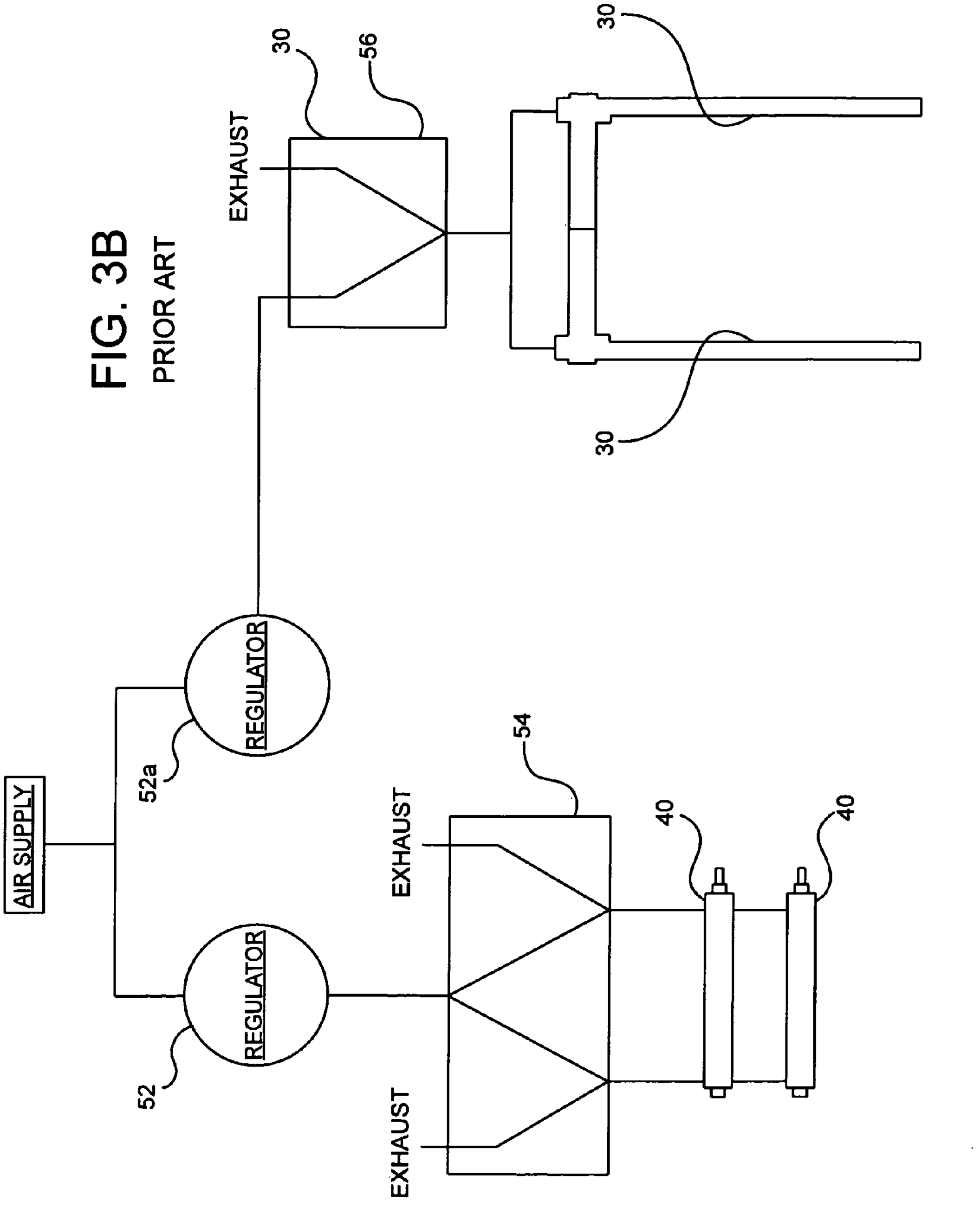
FIG. 3B PRIOR ART
FIG. 3B illustrates a schematic representation of an pressurizing system for the system of FIG. 1.
Figure 4:
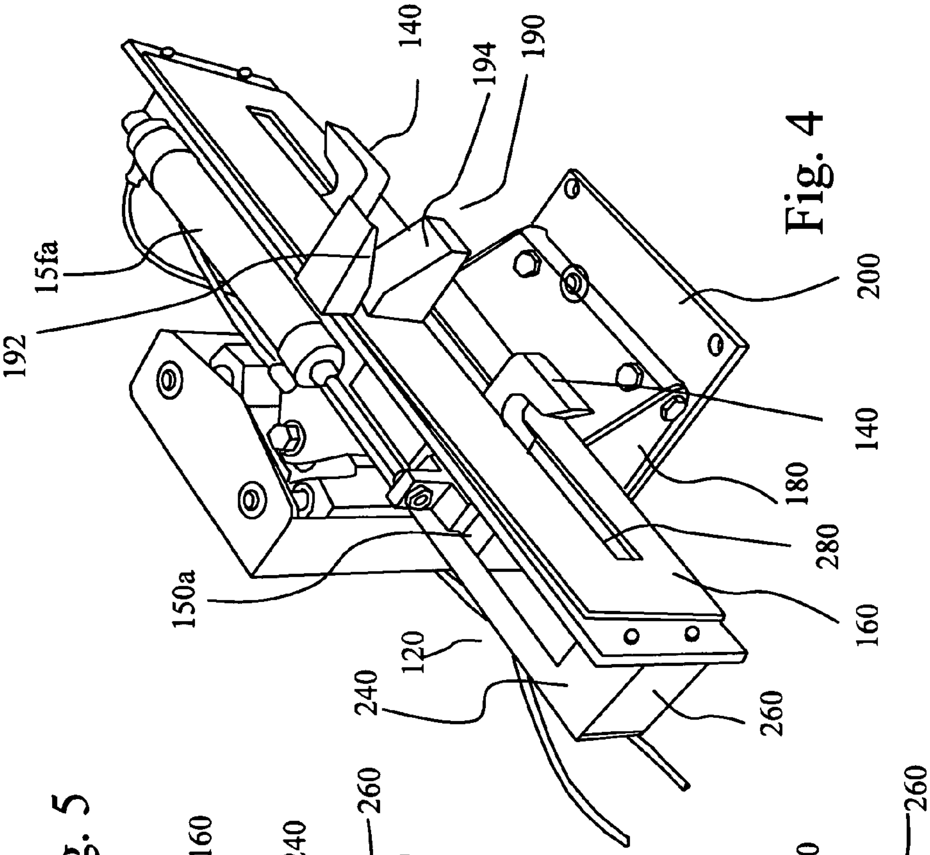
FIG. 4 illustrates a perspective view of another embodiment of a docking or securing system of the present invention.
Figure 5:
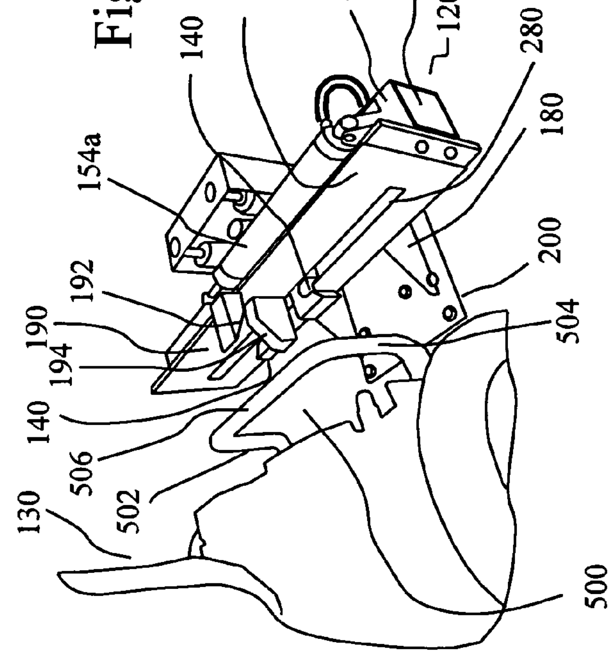
FIG. 5 illustrates another perspective view of the system of FIG. 4 wherein a wheeled mobility device including a universal device interface on a rearward end thereof moving into a position to effect connection to the system.
Figure 6:
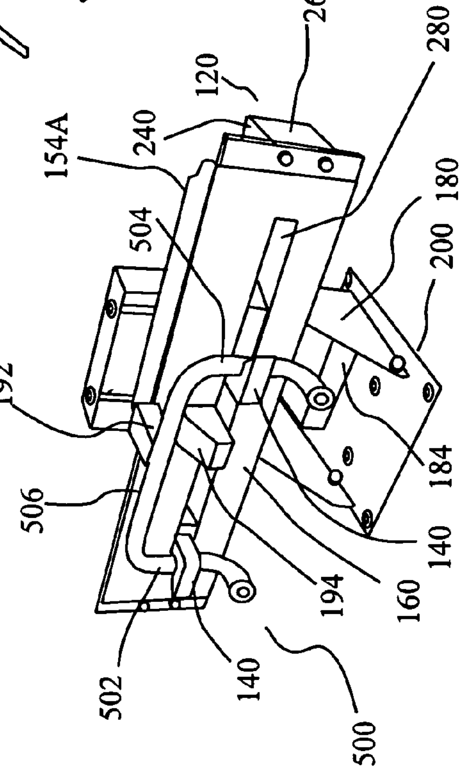
FIG. 6 illustrates another perspective view of the system of FIG. 4 wherein a the universal device interface is in connection with the system.
Figure 8:
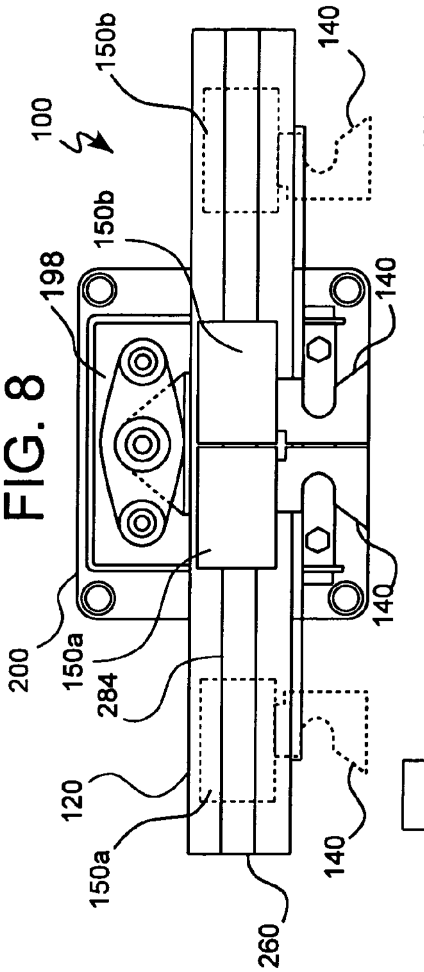
FIG. 8 illustrates a cutaway section of the system of FIG. 4 through line A-A of FIG. 7.
Figure 7:
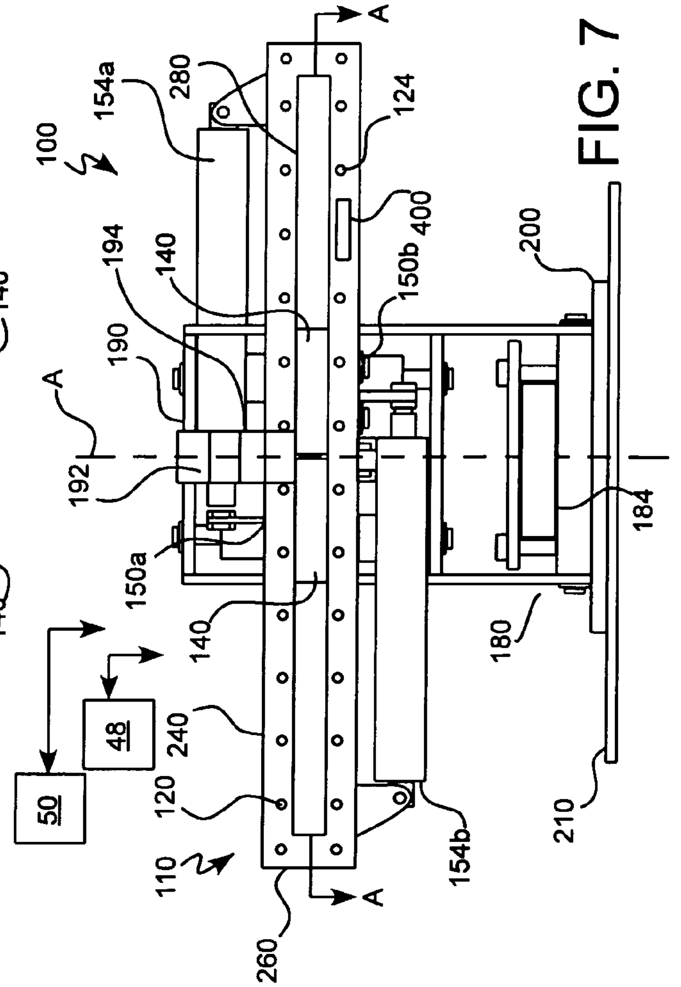
FIG. 7 illustrates a front view of the system of FIG. 4 wherein a contact plate of the system has been removed.
Figure 9:
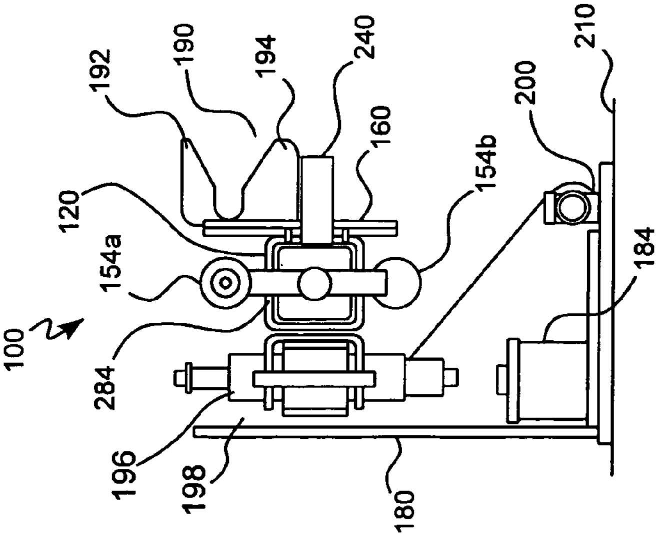
FIG. 9 illustrates a side cutaway view of the system of FIG. 4.

FIGS. 1 through 3B illustrate one embodiment of a docking or securement system 10. System 10 includes two generally horizontally adjustable plates 20 that have inflatable bellows 24 built into plates 20. Plates 20 are in operative connection with a frame 12. After backing a wheelchair (not shown in FIGS. 1 through 3B) into securement device 10, a user activates an accessible switch 30, which activates two pneumatic cylinders 40 that move plates 20 towards the wheelchair chair. The plate drive mechanism 50 is preferably self-centering so it can compensate for misalignment of the wheelchair in docking system 10. Plates 20 are in operative connection with members 22 that are in slidable connection with guide rods 24*a* and 24*b*. Once plates 20 contact the wheelchair or other wheeled mobility device, bellows 30 inflate into the cavities of the wheelchair creating two modes of restraint—friction and mechanical interlocking. Docking system 10 can, for example, be designed to fit within the geometry of a wheelchair passenger station on a transport vehicle Both air pressures (that is, for plate drive cylinders 40 and for bellows 30) are preferably adjustable so possible damage to wheelchairs can be minimized. FIG. 3B illustrates an embodiment of an air pressure control system 60 for use in connection with docking system 10. An air supply is in fluid connection with regulators 52 and 52*a*. Regulator 52 is in fluid connection with a four-way valve system 54 which controls operation of pneumatic cylinders 40. Regulator 52*a* is in fluid connection with a three-way valve system 56 which is in fluid connection with bellows 30.

An embodiment of an improved auto-docking securement system 100 of the present invention is illustrated, for example, in FIGS. 4 through 9. Several design criteria preferably incorporated into system 10 include, but are not limited to: crashworthiness; independent operation; automatic engagement; compatibility with all mobility devices; and compatibility with all vehicle types (that is, buses, vans etc.). System 100 is also preferably adapted to attach to an device interface on a wheelchair or other WMD such as, for example, universal docking interface geometry (UIDG) device or device interface 500 including a first attachment element 502 extending generally vertically and a second attachment element 504 extending generally vertically. First attachment element 502 is horizontally spaced from the second attachment element 504. A generally horizontal transverse element 506 is attached to the upper ends of first attachment element 502 and second attachment element 504. Device interface 500 can, for example, be formed monolithically from a workable metal of suitable structural strength to adequately secure wheeled mobility device 130 (for example, steel).

Since many users will not be able to visually observe the rear-located docking procedure, the latching process is preferably tolerant to angular misalignments in both the horizontal and vertical directions. That is, the latching mechanism compensates for off center-line misalignment, as well as misalignment that may occur as a result of, for example, differences in tire inflation. The operation of the system is preferably intuitive and readily operable by persons with a range of physical impairments. Finally, the vehicle-mounted component is preferably safe, durable, vandal-proof. The vehicle mounted component is also preferably readily incorporated within a vehicle (for example, by enclosure within a bus seat structure in a manner which also allow routine use by non-disabled passengers). The systems and devices of the present invention are also preferably readily retrofitable into existing transit vehicles, easy to maintain and compatible with standard electromechanical systems of transit vehicles.

System 100 includes a wheeled mobility device securement system engagement or docking unit 110 including, for example, a generally lateral or horizontal extending member, beam or frame 120 with engagement members, latches or jaws 140 and contact plates 160. The lateral frame 120 is pivotally mounted on a pedestal 180 which is further mounted on a mounting plate 200. The system 10 can include external connections to pneumatic and electric conduits as well as control panels 48 and 50.

To interface with the vehicle, a mounting plate 200 of system 100 can, for example, be secured to one or more surfaces 210 on a vehicle (not shown). Mounting plate 200 can, for example, be substantially rectangular in shape and formed from steel or other substantially rigid material suitable for securing the engagement or docking unit 110 to a vehicle (not shown). Holes can, for example, be formed in mounting plate 200 to allow the passage of bolts, screws, rivets, or other fastener suitable for affixing the wheeled mobility device securement system 100 to surface 210 of a vehicle.

Pedestal 180 can, for example, be attached at a substantially central location on the mounting plate 200 with fasteners, welds, or the like. The attachment of pedestal 180 to mounting plate 200 can be substantially rigid and sufficient to withstand the loads imparted thereto by a wheeled mobility device 130 within a transport vehicle, when tested to a standard crash pulse of 30 mph/20 g. Pedestal 180 can also house various internal components of the wheeled mobility device securement system 100 including electric, pneumatic, or hydraulic conduits as well as reservoirs for the same and power supplies or transformers. Pedestal 180 can, for example, be generally cubic or in any other suitable shape. Pedestal 180 can, for example, be constructed from steel or other material suitable to support the lateral frame 120 and house any internal components, To allow sufficient flexibility found in the variety of interface situations contemplated by the present invention, a pivot point is preferably provided in the interface between the pedestal 180 and the lateral frame 120 so that lateral frame 120 can pivot about axis A (see, for example, FIG. 7 and FIG. 10B1). The pivot point allows for angular docking misalignment between device interface 500 of wheeled mobility device 130 and engagement or docking unit 110.

Horizontal or lateral frame 120 can also be mounted to pedestal 180 in such a manner to place an energy absorbing element 184 somewhere in the load path. Energy absorbing element 184 (for example, a shock absorbing or crush element) can reduce the severity of the impact forces experienced by wheeled mobile device 130 and its occupant.

Lateral frame 120 can, for example, be a substantially transverse rectangular frame having a top portion 240, side plates 260, a front channel 280, and pneumatic apertures. Channel 280 is preferably oriented generally horizontally with respect to surface 210 and is preferably generally parallel to the lateral axis of the lateral frame 120. A channel rod 284 can be disposed within the channel 280. Latches or jaws 140 can, for example, be slidably mounted on the channel rod 284, with each of latches 140 being capable of laterally traversing the channel 280 along the length of channel 280 from substantially the vertical center line of lateral frame 120 to the respective side plates 260 of the lateral frame 120. Each of latches 140 is operatively connected to pneumatically driven piston rods 150*a* and 150*b* disposed, for example, at least partially within the interior of lateral frame 120. Each of drive piston rods 150*a* and 150*b* connects to a drive system including, for example, drive members such as pneumatic cylinders 154*a* and 154*b* in fluid communication with one or more of the pneumatic apertures. As clear to one skilled in the art one or more drive members other than pneumatic cylinders (for example, electric motors, hydraulic cylinders etc.) can also or alternatively be used. In the illustrated embodiment, each drive member 154*a* and 154*b* provides an opposing lateral motive force to transport each of latches 140 in opposing directions along, for example, channel 280. Top portion 240, side plates 260, channel rod 284, and latches 140 can each be constructed from substantially rigid materials such as steel, aluminum, or any of various metal alloys, ceramics, plastics, or other materials that allow sufficient workability to substantially form these components, yet retaining sufficient rigidity and strength to act in concert in securing a wheeled mobility device 130 to a transport vehicle.

One or more contact or impact plates 160 can be provided on the front face 124 of lateral frame 120 to interface with wheeled mobility device 130. One or more portions of front face 124 of the lateral frame 120 or contact plate 160 can, for example, be equipped with a sensor system 400 (illustrated schematically in FIG. 8) adapted to sense when device interface 500 of wheeled mobility device 130 attains one or more desirable positions with respect to the engagement or docking unit 110. Sensor system 400 can, for example, utilize electrical, optical, magnetic, electro-mechanical, or mechanical proximity sensing devices to sense the appropriate location of a wheeled mobility device 130 and/or device interface 500. In addition to sensing the proximity of wheeled mobility device 130, sensing system 400 can also be capable of sensing an off-center alignment of the wheeled mobility device 130 relative to the vertical center line of the lateral frame 120. After contact of one of latches 140 with one of first or second attachment elements 502 and 504, respectively, system 100 provides for additional travel to the other one of the latches 140 in the event that universal docking interface geometry device 500 of wheeled mobility device 130 is not centered with respect to the engagement mechanism of the docking unit 110.

Each of the latches 140 has a substantially J-shaped or hook-shaped orientation wherein each J is laterally disposed, and the opening of each J is toward the respective side plate 260 of the lateral frame 120. A protruding member of each of the latches 140 extends from front face 124 of the lateral frame 120 by an amount sufficient to allow the opening of each J shape to have sufficient clearance in front of the front face 124 and contact plate 160 of lateral frame 120 to form an operative connection with first attachment element 502 and second attachment element 504 of universal docking interface geometry device or device interface 500.

Docking unit 110 can also be vertically movable relative to pedestal 180 to allow for vertical misalignment of, for example, device interface 500 therewith. For example, vertical alignment device 190 including contact members 192 and 194 having oppositely sloped surfaces to create an open jaw or V-shaped contact can be provided. As illustrated, for example, in connection with FIGS. 5 and 6, generally horizontal element 506 of device interface 500 can first contact one of contact members 192 or 194. If contact member 192 is first contacted, the resultant vertically upward component of the force on docking unit 110 will cause docking unit 110 to move upward until horizontal element 506 is centered between contact members 192 and 194. If contact member 194 is first contacted, the resultant vertically downward component of the force on docking unit 110 will cause docking unit 110 to move downward until horizontal element 506 is centered between contact members 192 and 194. Vertical motion of docking unit 110 can, for example, occur along a vertical alignment track 196 of a vertical alignment carriage 198 (see, for example, FIGS. 8 and 9).

Figure 1:
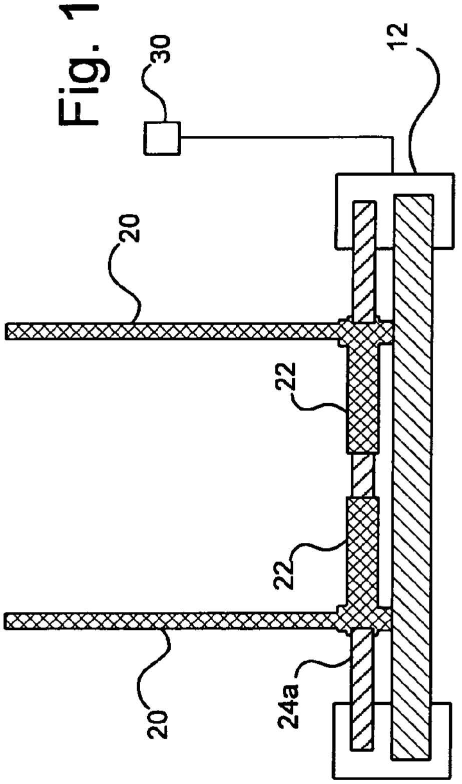
Fig. 1 PRIOR ART
FIG. 1 illustrates a top view of an embodiment of a docking or securement system.
Figure 2:
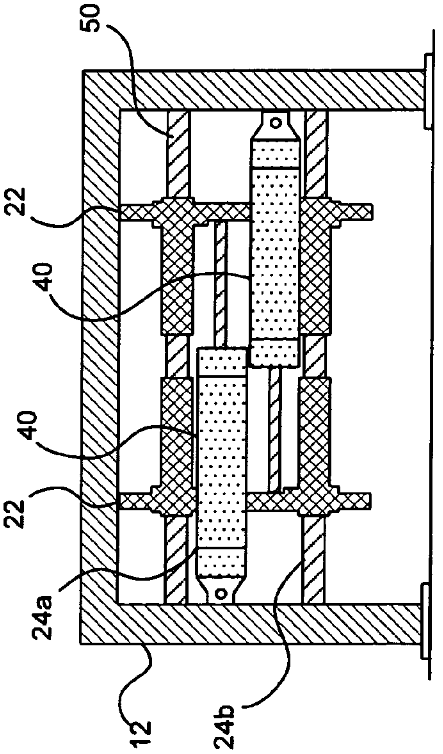
Fig. 2 PRIOR ART
FIG. 2 illustrates a rear view of the system of FIG. 1.
Figure 10A:
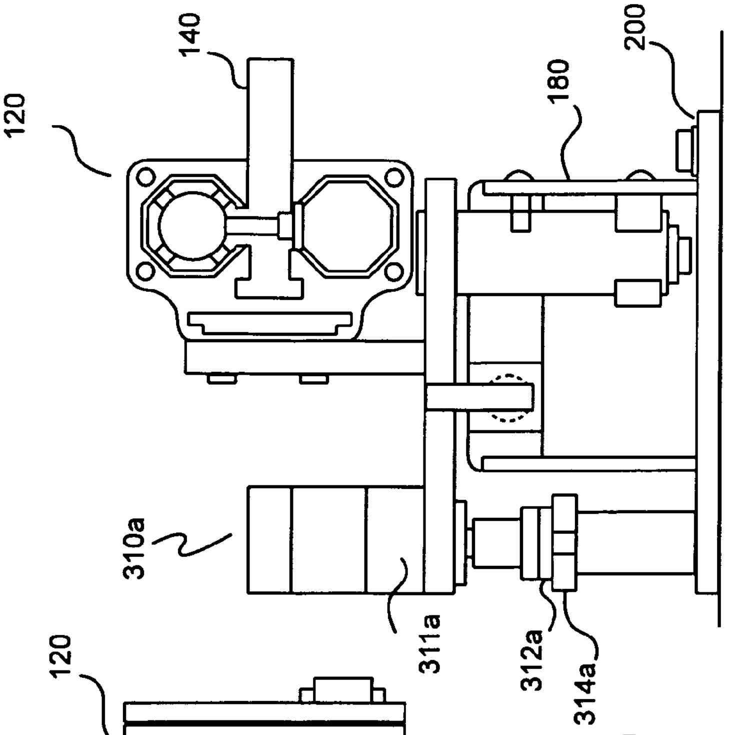
FIG. 10A illustrates a rear view of another embodiment of a docking or securement system of the present invention including a braking system of mechanism to limit swivel.
Figure 10A:
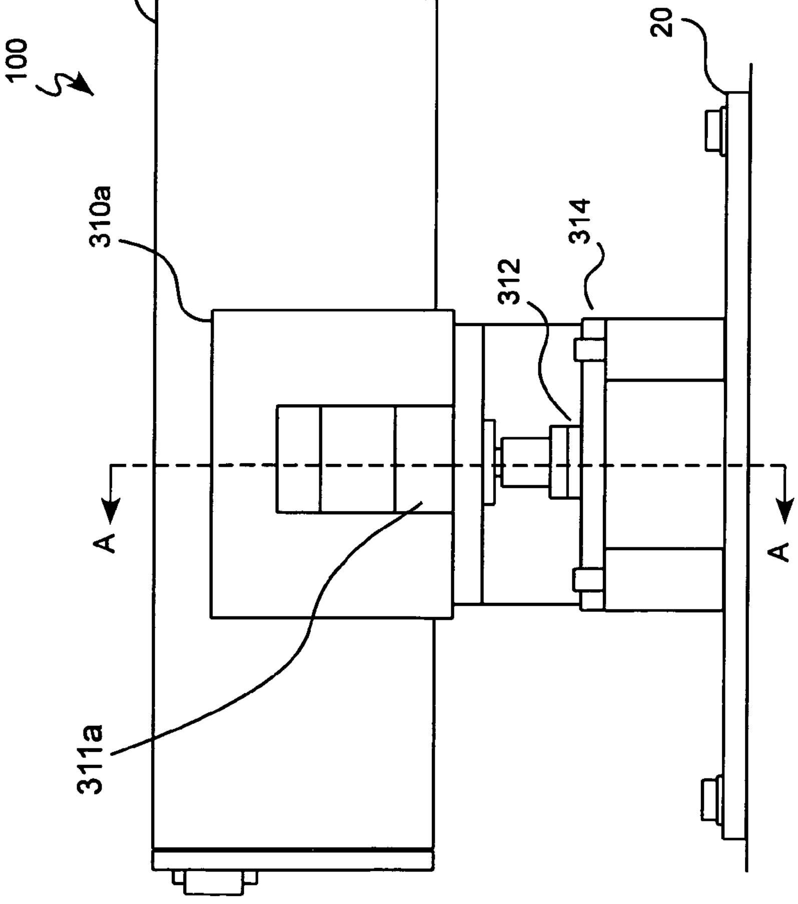

In several embodiments, a brake mechanism 310*a* or swivel limit mechanism, including, for example, a braking cylinder 311*a* as illustrated in FIGS. 10A and 10A1, can be provided to drive a brake pad 312*a* against a stator plate 314*a* mounted to mounting plate 200 to secure lateral frame 120 to the wheeled mobility device 130 in an angular misalignment docking scenario. A housing can be provided over the breaking cylinder 310*a* to secure it from contamination and tampering. The brake system can be activated after docking, to prevent or limit swiveling of lateral frame 120 (and wheeled mobility device 130) after docking.

Figure 10B:
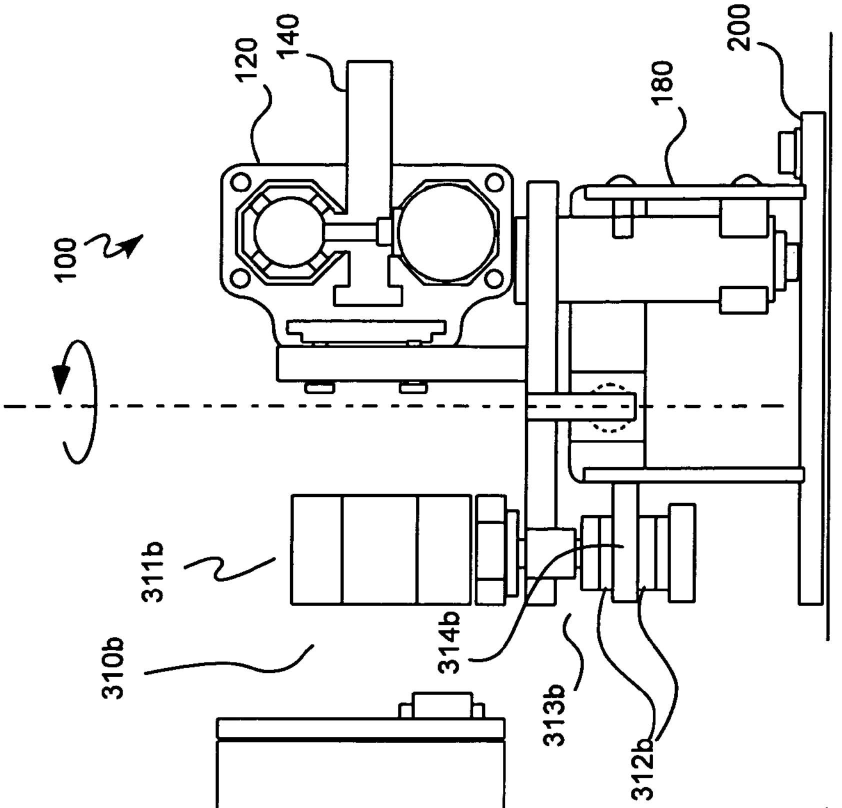
FIG. 10B illustrates a rear view of another embodiment of a docking or securement system of the present invention including a braking system of mechanism to limit swivel.
Figure 10B:
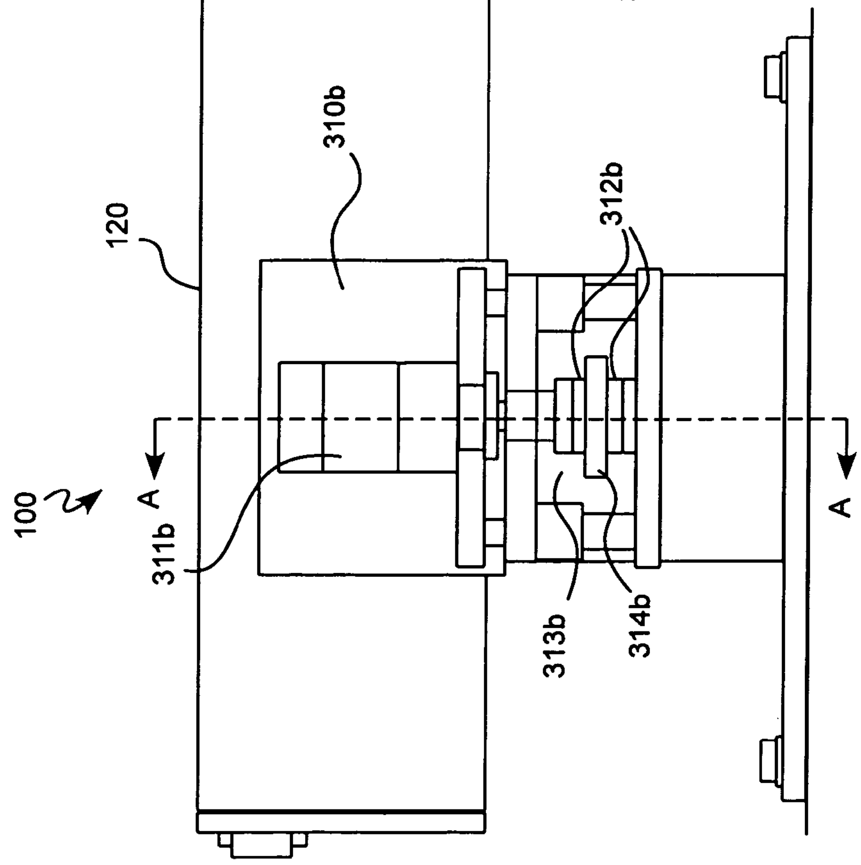
Figure 10C:
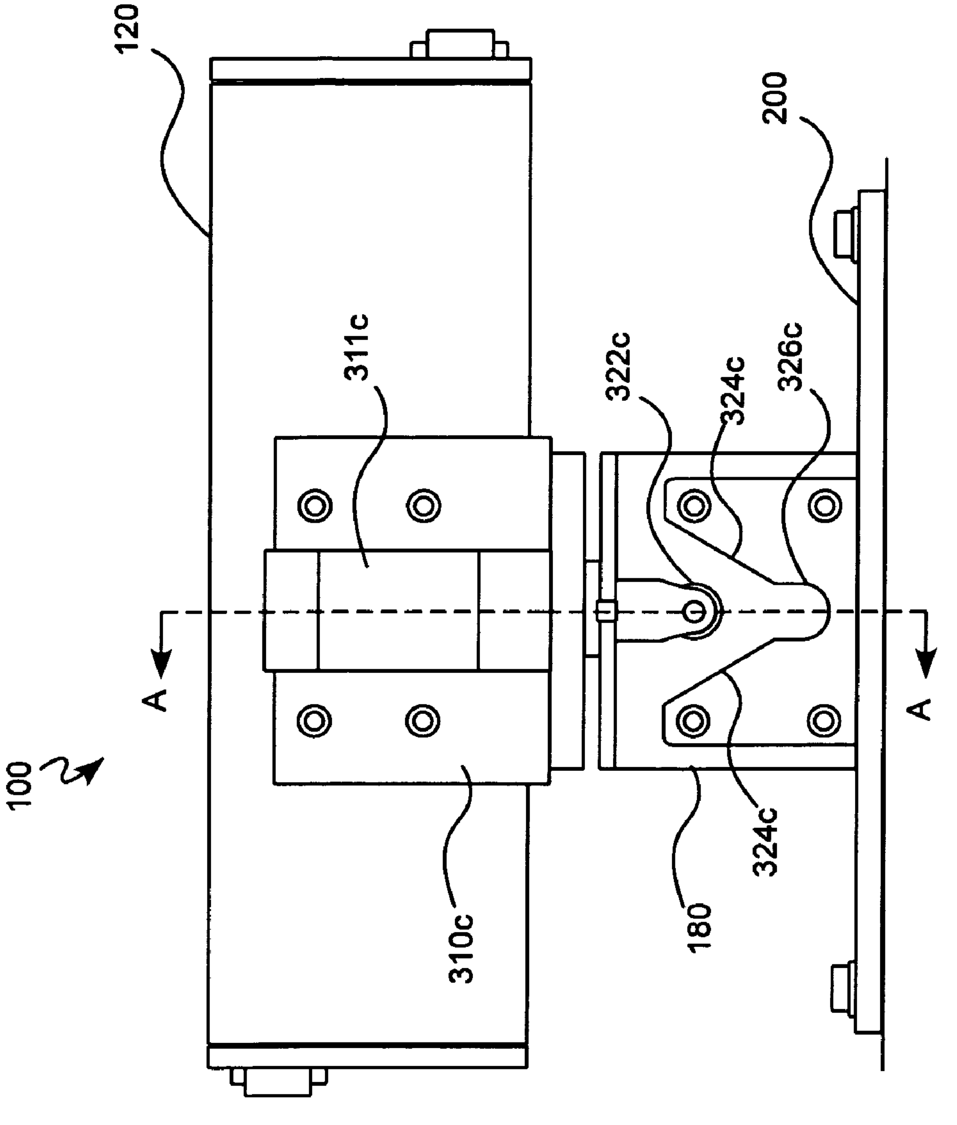
FIG. 10C illustrates a rear view of another embodiment of a docking or securement system of the present invention including a braking system of mechanism to limit swivel.
Figure 10D:
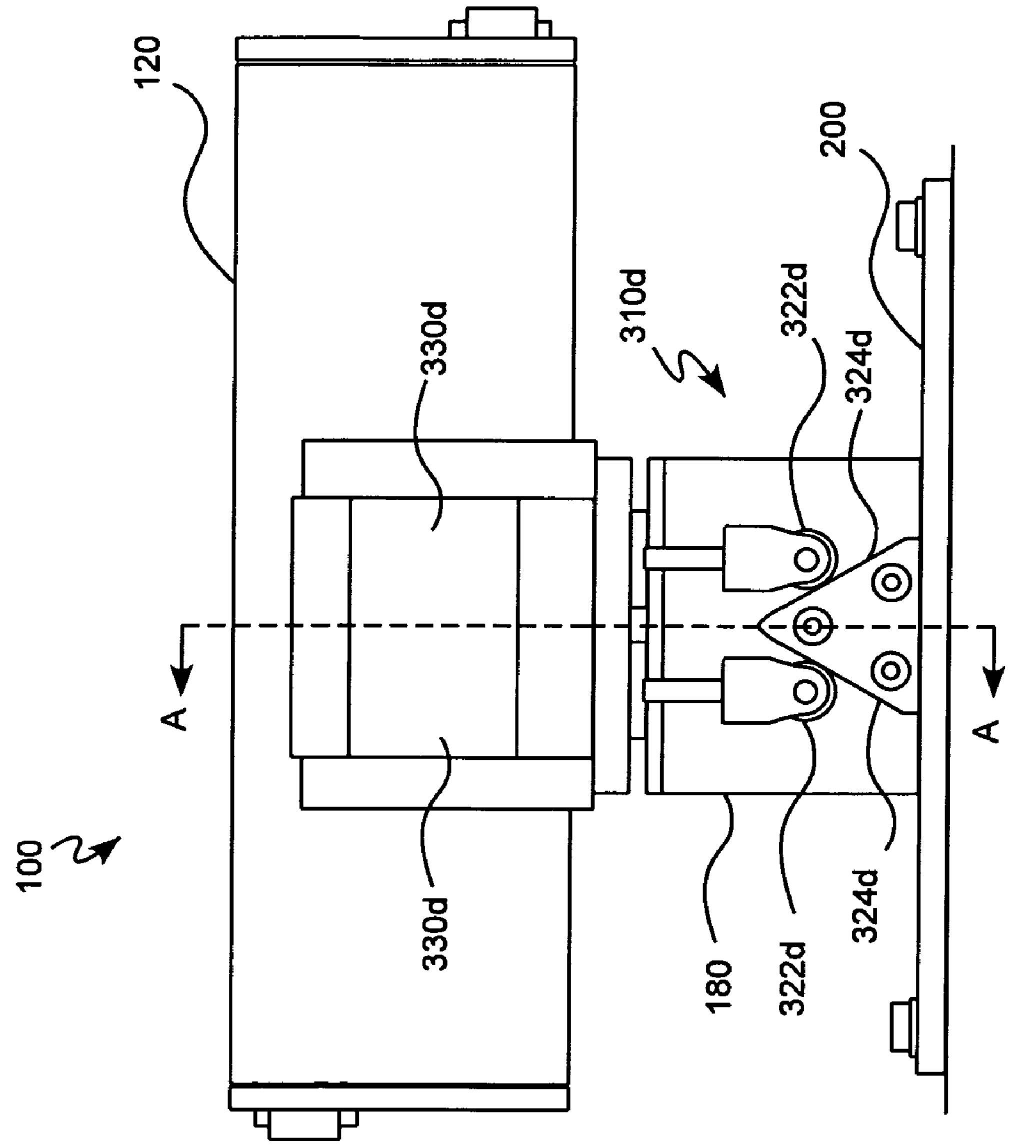
FIG. 10D illustrates a rear view of another embodiment of a docking or securement system of the present invention including a braking system of mechanism to limit swivel.

Other types of break brake mechanisms are illustrated in FIGS. 10B through 10D. Braking mechanism 310*b* of FIGS. 10B and 10B1 is similar in design and operation to the embodiment of FIGS. 10A and 10A1. In the embodiment of FIGS. 10B and 10B1, however, the brake mechanism 310*b* includes a free-floating caliper 313*b* to ensure better contact of brake pads 312*b* with stationary plate 314*b*. Brake mechanism or system 300*c* of FIG. 310*c* includes a single air cylinder driving a cam follower 322*c* along one of two inclined surfaces 324*c* when the docking mechanism is off center. Driving cam follower 322*c* along one of inclined surfaces 324*c* as described above exerts force to center docking mechanism 110, or (depending on the forces) can simply resist any further swiveling in the same direction. Should device 130 begin to swivel in the other direction, cam follower 322*c* would be driven downward into a generally parallel slot 326*c* when docking mechanism 110 became centered, thus preventing further swiveling in either direction. In the embodiment of FIG. 10D, brake system 310*d* includes two air cylinders 330*d*. Each of cylinders 330*d* drives a cam follower 322*d* along one of two inclined surfaces 324*d*. Should the docking mechanism be off center, one cam follower 322*d* would strike its inclined surface 324*d* before the other. Second cam follower 322*d* may follow quickly to act much as the self centering feature of the latch mechanism described above and would simply resist any further swiveling of the docking system.

During operation, an occupant of a wheeled mobility device 130 aligns his or her wheeled mobility device 130 as best he or she can such that a device interface such as universal docking interface geometry device or device interface 500 is substantially centered on and approaches contact or impact plates 160 on front face 124 of the lateral frame 120. Once device interface 500 is in a location appropriate for docking, actuating or sensing system 400 can, for example, signal the appropriate circuitry as known in the electrical arts) to initiate the (auto latching) sequence.

In executing the locking sequence, the wheeled mobility device securement system 100 actuates pneumatic cylinders 154*a* and 154*b* operatively connected to each of the latches 140 on the lateral frame 120. Latches 140 are thus actuated toward side plates 260 of the lateral frame 120 to capture attachment elements 502 and 504 of universal docking interface geometry device 500 that is secured to the wheeled mobility device 130. Once properly secured, the wheeled mobility device securement system 100 can, for example, indicate the secure status by activating relevant lights on occupant control interface panel 48, and the vehicle operator control interface panel 50. Once wheeled mobility device 130 is secure, the vehicle operator may safely operate the vehicle knowing wheeled mobility device 130 and its occupant are properly secured within the vehicle. In addition to these measures, it may be desirable to provide an external safety belt (not shown) to further restraint the wheeled mobility device occupant into wheeled mobility device 130.

When the occupant of the wheeled mobility device 130 desires to exit the vehicle, either the occupant or the vehicle operator can, for example, release the latches 140 of wheeled mobility device securement system 10 by activating an appropriate control on the relevant interface panel 48 or 50. Once activated to a release mode, system 100 operates pneumatic cylinders 154*a* and 154*b* to move latches 140 toward a disengaged orientation with respect to universal docking interface geometry device 500. Once released, the occupant of wheeled mobility device 130 is free to move the wheeled mobility device away from the engagement mechanism on docking unit 110.

The system can also include a mechanical override of the pneumatic engagement system that can be deployed in the event of emergency or a power failure on the transport vehicle.

Another embodiment of a securement system 100*a* of the present invention is illustrated in FIG. 11A through 11E. In many respects, system 100*a* operates in the manner of system 100 and like components are numbered in a corresponding manner with the addition of the designation "a" thereto. In that regard, docking device 110*a* includes a horizontal or lateral frame 120*a* that is pivotably mounted on a pedestal 180*a* and serves both as a backstop for the wheeled mobile device 130 and the mounting structure for the self-adjusting latching mechanism. The latching mechanism includes two horizontally moving and self-centering latches 140*a* that engage vertical elements 502 and 504 of device interface 100 The engagement prevents lateral and fore-aft movement, as well as rotation of wheeled mobile device 130 and the occupant thereof under crash loads. Unlike system 100, horizontal or lateral frame 120*a* of system 100*a* is mounted to pedestal 180*a* is such a manner to place an energy absorbing element 184*a* more in line with the load path (see FIG. 11B). This may reduces the severity of the impact forces experienced by wheeled mobile device 130 and its occupant in certain circumstances.

As with system 100, a user of a wheeled mobile device 130 moves rearward until device interface 500 strikes contact plate or impact plate 160*a* on docking device 110*a*. This action causes horizontal frame 120*a* and the attached latching mechanism to rotate, move up, and/or move down until it aligns with device interface 500. At this point the latching mechanism auto-engages with device interface 500. To exit the station the user simply reverses the process. An override control switch located, for example, on consol 50 in the vehicle operator's station can, for example, prevent any inadvertent operation of docking device 110 (for example, inadvertent release while the vehicle is moving). Movement and self centering of latches 140*a* (as well as latches 140) is accomplished by the arrangement of the dual pneumatic cylinders 154*aa* and 152*ab* (for example, 1.5 inch diameter pneumatic cylinders), which can be in fluid connection with a single regulator in fluid connection with an air supply or pressurized air tank, operating at a pressure (approximately 50 psi) that does not cause damage to the universal docking interface geometry device 500. The pressure used to operate latches 140*a* (and latches 140) is also not great enough to cause movement of wheeled mobility device 130 upon contact of one of latches 140*a* with device interface 500. In the case of an off-center docking procedure, upon contact of one of latches 140*a* with one of vertical elements 502 and 504, the contacting latch 140*a* is stopped by the encountered resistance. The other of latches 140*a* (which has not yet come into contact with such resistance) continues to move until it contacts the other of vertical elements 502 and 504 and pressure is equalized in cylinders 154*aa* and 154*ab*. The above-described operation of latches 140*a* provides a self-centering latching/docking mechanism over a range of horizontal positions of device interface 500 relative to docking device 100*a*.

Figures 11A, 11B, 11C, 11D, 11E:
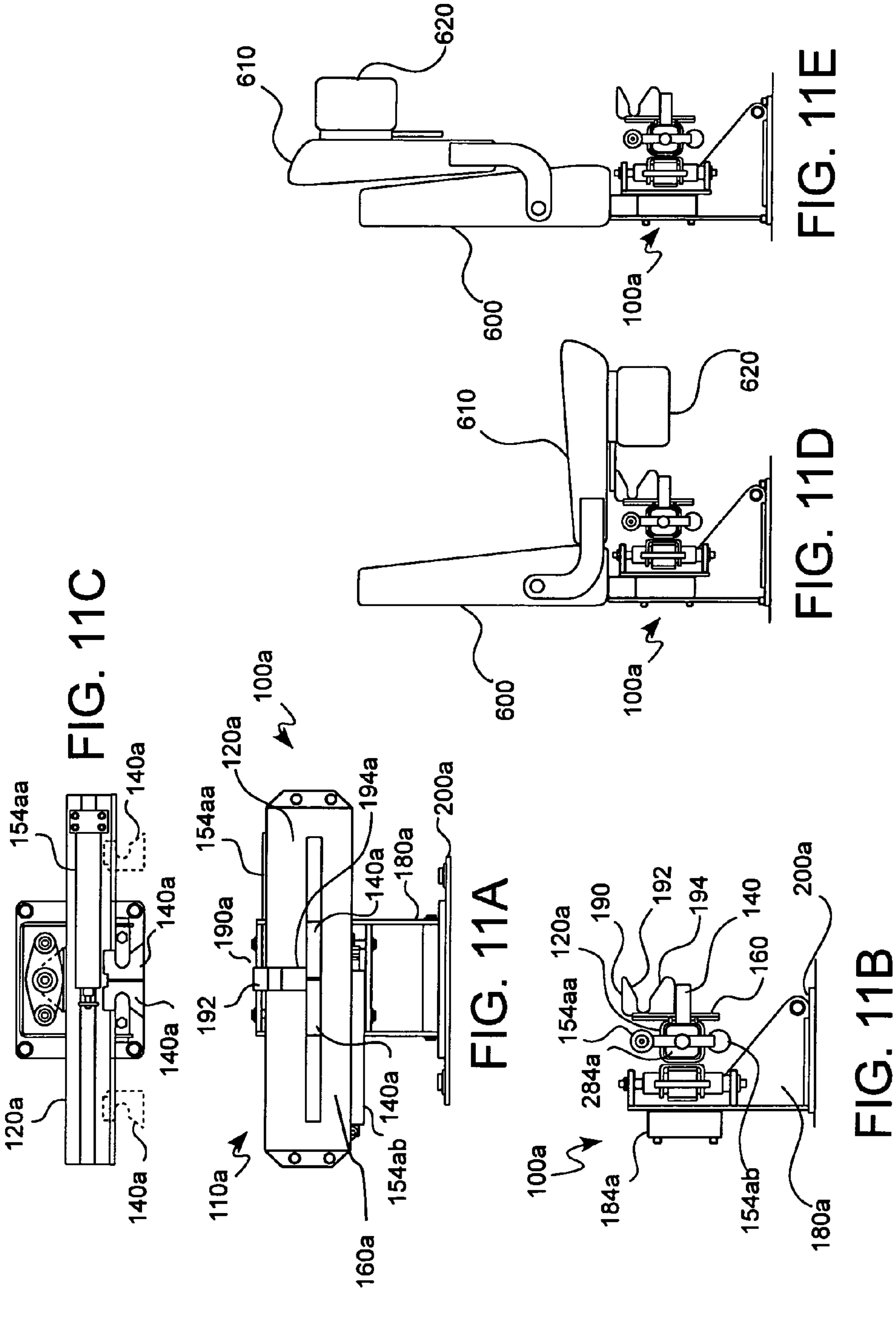
FIG. 11A illustrates a front view of another embodiment of a docking or securement device of the present invention.
FIG. 11B illustrates a side cutaway view of the system of FIG. 11A.
FIG. 11C illustrates a top view of the system of FIG. 11A.
FIG. 11D illustrates the system of 11A mounted under a transit vehicle seat.
FIG. 11E illustrates the system of 11A mounted under a transit vehicle seat wherein a seating section of the seat is rotated upward to a vertical position to allow access to the system.

FIGS. 11D and 11E illustrate the mounting of system 100*a* under a transit vehicle seat 600 that enables use of seat 600 by an ambulatory person and access to system 100*a* by wheeled mobile device 130 when a seating section 610 of seat 600 is rotated (flipped-up) to a vertical position. A headrest 620 for the occupant of wheeled mobile device 130 can, for example, be provided on an underside of seating section 610, or mounted elsewhere on the seat back or vehicle wall.

Figure 12A:
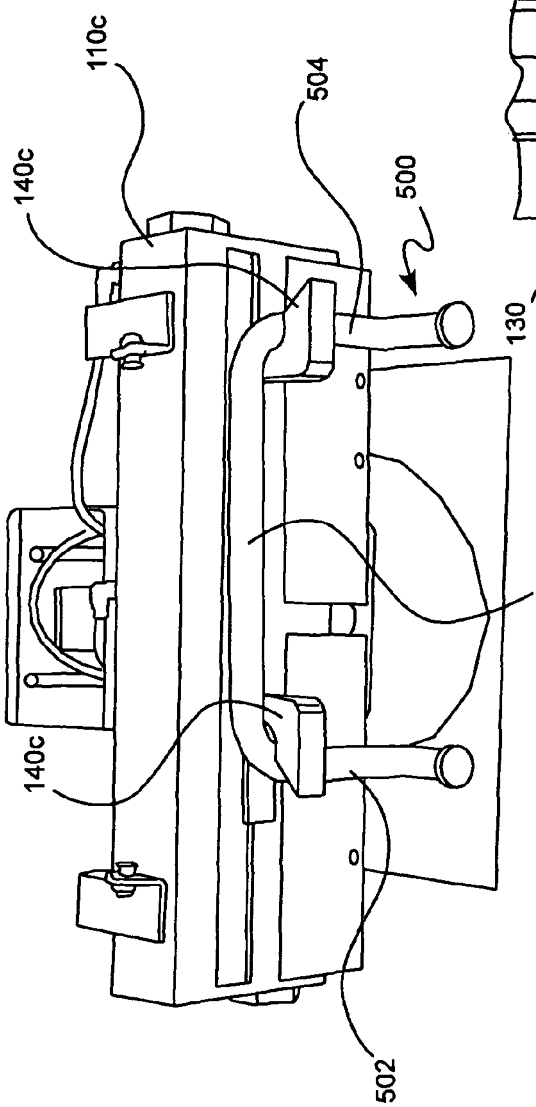
FIG. 12A illustrates a perspective view of another embodiment of a docking or securement system of the present invention with a universal device interface attached thereto in an off-center horizontal position.
Figure 12B:
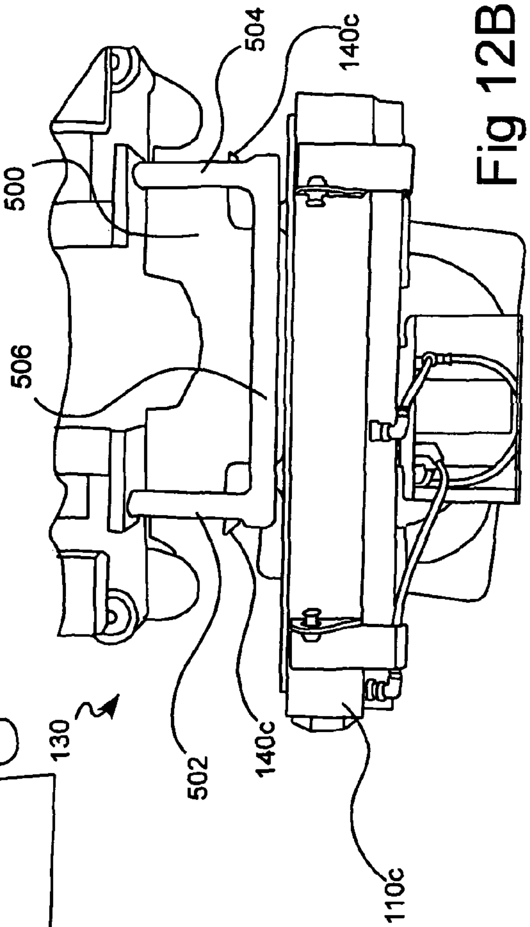
FIG. 12B illustrates a perspective view of the system of claim 12A with a universal device interface attached thereto in an off-center horizontal and angled or swiveled position.

FIGS. 12A and 12B illustrate another embodiment of a system 100*c* of the present invention including a one-piece, extruded aluminum body 110*c* that houses the two activating pneumatic cylinders (not shown) and other elements (as described above) for movement of self-centering latches 140*c*. FIG. 12B illustrates attachment of latches 140*c* to universal docking interface geometry device 500 normally attached to the wheeled mobility device 130 wherein aluminum body 110*c* has been required to rotate or swivel relative to pedestal 180*c*. FIGS. 12A and 12B also illustrates attachment of universal docking interface geometry device wherein housing body 110*c* has been swiveled to effect attachment.

The systems of the present invention were successfully crash tested at a crash sled facility. Crash loads were established that the device components would be required to withstand during a 30 mph 20 g, frontal crash event, which was a requirement in the then evolving and now published) ISO industry standard (ISO 10542-3) (2005). Computer simulation models were first developed, followed by actual crash testing.

Two 30 mph 20 g frontal impact sled tests were conducted on, for example, system 100 as a part of the crash safety evaluation. Sled impact tests were conducted at the University of Michigan Transportation Research Institute (UMTRI). The entire sled impact event was recorded using high-speed motion cameras positioned at the side, rear and overhead.

As discussed above, 4-point strap type tiedowns represent the most common public transit WMD securement system currently available. Accordingly, the performance of docking system 100 was compared to the crash performance of 4-point tiedown systems. In that regard, a comparison of occupant response during a frontal impact sled test when securing the surrogate wheelchair using docking system 100 and a 4-point tiedown system was conducted. Docking system 100 of the present invention successfully met all safety requirements of the SAE J2249 WTORS industry standard (Society of Automotive Engineers (SAE), SAE J2249 Wheelchair Tiedowns and Occupant Restraint Systems (WTORS) for use in motor vehicles. (1996). Further, when compared to commonly used 4-point strap type tiedowns, docking system 100 of the present invention provided improved occupant frontal crash response.

Accessibility tests and comparison tests to existing commercial systems were also conducted. The tests were performed to evaluate the ease of maneuverability when engaging docking systems of the present invention. Overall, the results of the laboratory testing were positive. In-vehicle transit bus tests were also conducted under actual emergency driving maneuvers. These results were also positive.

Although the manufacturing cost of the docking systems of the present invention may exceed the cost of existing webbing tiedown systems, the docking systems of the present invention eliminate the need for an attendant to be present to secure a wheeled mobility device or the need for the vehicle driver to leave his position to restrain the wheeled mobility device. Also, as described above, visual, audio and/or tactile indicators can be provided that indicate the wheeled mobility device has been correctly secured or is in a release mode. Eliminating the requirement of the presence of an attendant or eliminating the requirement that a driver leave his position to secure the wheeled mobility device, will result in recovery of the increased costs of the docking systems of the present invention over a relatively short period of time.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A docking device for use with a wheeled mobility device comprising a device interface on a rear of the wheeled mobility device, the device interface comprising a first attachment element and a second attachment element laterally spaced from the first attachment element, the docking device comprising:

a securing mechanism to dock with the device interface, the securing mechanism adapted to dock with the device interface upon rearward motion of the wheeled mobility device relative to the docking device over a range of horizontal positions of the device interface relative to the securing mechanism, the securing mechanism comprising a mount adapted to be attached to a surface over which the wheeled mobility device is mobile, a first securing member in connection with the mount, the first securing member being moveable in first a lateral direction to engage the first attachment element, and a second securing member in connection with the mount, the second securing member being moveable in a second lateral direction, opposite of the first lateral direction, to engage the second attachment element, the first securing member and the second securing member being rotatably connected to the mount to align the first securing member and the second securing member to engage the first attachment element and the second attachment element, respectively, over a range of angles of initial misalignment of the device interface relative to the securing mechanism.

2. The docking device of claim 1 wherein the securing mechanism comprises a laterally extending surface rotatable relative to the mount, the first securing member and the second securing member extending forward of the laterally extending surface.

3. The docking device of claim 1 wherein the securing mechanism is adapted to dock with the device interface over a range of vertical positions of the device interface relative to the securing mechanism.

4. The docking device of claim 1 wherein the first securing member and the second securing member rotate relative to the mount to automatically align the first securing member and the second securing member to engage the first attachment element and the second attachment element upon contact of the device interface with the securing mechanism.

5. The docking device of claim 4 wherein the securing mechanism further comprises at least one mechanism to limit rotation of the first securing member and the second securing member relative to the mount after the first securing member engages the first attachment element and the second securing member engages the second attachment element.

6. The docking device of claim 4 wherein the first securing member is operatively connected to a first drive adapted to move the first securing member in a first direction and the second securing member is operatively connected to a second drive adapted to move the second securing member in a second direction.

7. The docking device of claim 6 wherein the docking device comprises an actuator system in operative connection with the first drive and the second drive, the actuator system being adapted to activate the first drive and the second drive when the device interface reaches predefined position relative to the docking device.

8. The docking device of claim 7 further comprising a generally laterally extending surface along which the first securing member and the second securing member are moveable.

9. The docking device of claim 8 wherein the laterally extending surface is in rotabable connection with the mount upon contact of the device interface with the laterally extending surface.

10. The docking device of claim 9 wherein the laterally extending surface, the first securing member, the second securing member, the first drive and the second drive are rotatable as a unit relative to the mount.

11. The docking device of claim 10 wherein the first securing member and the second securing member are moveable in a generally vertical direction relative to the mount upon contact of the securing mechanism with the device interface so that the securing mechanism is adapted to dock with the device interface over a range of initial vertical positions of the first securing member and the second securing member relative to the device interface.

12. The docking device of claim 10 wherein the first securing member comprises a first hook-shaped member adapted to engage the first attachment element and the second securing member comprises a second hook-shaped member adapted to engage the second attachment element.

13. The docking device of claim 10 wherein the first securing member and the second securing member are initially positioned so that the first securing member and the second securing member move away from each other to engage the first attachment element and the second attachment element respectively.

14. The docking device of 10 wherein the docking device further comprises a housing in which the first drive and the second drive are positioned, the housing comprising the laterally extending surface, the housing being rotatable relative to the mount.

15. The docking device of claim 14 wherein the housing comprises a monolithic length of extruded aluminum, extended opening being formed in the length of extruded aluminum, the length of extruded aluminum comprising a volume therein in connection with the extending opening in which the first drive and the second drive are positioned.

16. The docking device of claim 1 wherein the range of horizontal positions of the device interface relative to the securing mechanism is at least ±4 inches.

17. The docking device of claim 10 wherein the range of angles of initial misalignment of the device interface relative to the securing mechanism is at least ±10°.

18. The docking device of claim 3 further comprising at least one vertical alignment member in operative connection with the first securing member and the second securing member, the vertical alignment member adapted to cause vertical movement of the first securing member and the second securing member relative to the mount upon contact of the vertical alignment member with the device interface.

19. The docking device of claim 14 further comprising a mechanism to limit rotation of the housing relative to the mount after the first securing member engages the first attachment element and the second securing member engages the second attachment element.

20. The docking device of claim 19 wherein the mechanism to limit rotation of the housing comprises a braking system.

21. The docking system of claim 10 further comprising a sensing system to sense proximity of the device interface to the securing mechanism, and a control system in operative connection with the sensing system, the sensing system adapted to send a signal to the control system to cause movement of the first securing member and the second securing member upon sensing proximity of the device interface to the securing mechanism.

* * * * *